United States Patent
Jakubiuk et al.

(10) Patent No.: US 12,223,425 B2
(45) Date of Patent: Feb. 11, 2025

(54) END-TO-END OPTIMIZATION

(71) Applicant: ONSPECTA, INC., Redwood City, CA (US)

(72) Inventors: Victor Jakubiuk, San Francisco, CA (US); Sebastian Kaczor, Poznan (PL)

(73) Assignee: OnSpecta, Inc., Redwood City, CA (US)

( * ) Notice: Subject to any disclaimer, the term of this patent is extended or adjusted under 35 U.S.C. 154(b) by 1002 days.

(21) Appl. No.: 17/204,870

(22) Filed: Mar. 17, 2021

(65) Prior Publication Data

US 2021/0295158 A1 Sep. 23, 2021

Related U.S. Application Data

(60) Provisional application No. 62/990,499, filed on Mar. 17, 2020.

(51) Int. Cl.
| | |
|---|---|
| *G06N 3/08* | (2023.01) |
| *G06N 3/045* | (2023.01) |
| *G06N 3/063* | (2023.01) |
| *G06N 3/096* | (2023.01) |
| *G06N 5/01* | (2023.01) |

(52) U.S. Cl.
CPC ............... *G06N 3/08* (2013.01); *G06N 3/045* (2023.01); *G06N 3/063* (2013.01); *G06N 5/01* (2023.01); *G06N 3/096* (2023.01)

(58) Field of Classification Search
CPC ........ G06N 20/00; G06N 20/10; G06N 20/20; G06N 3/02; G06N 3/04; G06N 3/045; G06N 3/06; G06N 3/063; G06N 3/096; G06N 5/00; G06N 5/01; G06N 5/02; G06N 3/08

See application file for complete search history.

(56) References Cited

U.S. PATENT DOCUMENTS

2019/0101902 A1\* 4/2019 SayyarRodsari .... G05B 19/054
2020/0387814 A1\* 12/2020 Yellapragada ........... G06N 5/04

\* cited by examiner

*Primary Examiner* — Shane D Woolwine
(74) *Attorney, Agent, or Firm* — Cognition IP, P.C.; Edward Steakley

(57) ABSTRACT

Methods, systems, and apparatus, including computer programs encoded on computer storage media, includes various embodiments for receiving a plurality of characteristics of a target artificial intelligence (AI) network. The various embodiments apply the plurality of characteristics of the target AI network to at least one of a static cost model and a heuristic AI network model. The various embodiments further receive optimized target AI network configuration data from at least one of static cost model and the heuristic AI network model, the optimized target AI network configuration data representative of a subset of the characteristics of the target AI network that minimize a cost function of execution of the target AI network.

17 Claims, 7 Drawing Sheets

END-TO-END OPTIMIZATION

CROSS-REFERENCE TO RELATED APPLICATIONS

This application claims the benefit of U.S. Provisional Application 62/990,499, filed on Mar. 17, 2020, which is hereby incorporated by reference in its entirety.

BACKGROUND

In the field of computer science, artificial intelligence ("AI") networks, such as neural networks and deep learning networks, are increasingly being employed to solve a variety of tasks and challenging problems, often with great success. Such AI networks can consist of computational graphs with nodes representing computational operations ("ops"), and connections in between those ops. Each op computes something on input data in order to produce output data. Within AI networks there are fairly predefined ops, and there can be, e.g., hundreds or thousands of these ops. Such ops can represent such computational tasks as matrix multiplication and convolution, often using many pieces of input data from within the network. An AI network can be thought of at one level as a list of ops, or operations, that get executed in a particular order to produce an output.

Operators of AI networks are interested in making them as efficient as possible, on many possible hardware components and across many different hardware architectures. One challenge involved in this goal is that in order to run an AI network on a particular piece of hardware, it's necessary to support every op that particular AI network uses on that particular piece of hardware. Two traditional approaches for implementing or coding an AI network can be outlined, with both having advantages and disadvantages.

One approach to coding an AI network involves designing and optimizing the software code implementing the AI network for a target hardware. For example, some workloads can be coded to target running the AI network on a central processing unit (CPU). Other AI networks may be coded and optimized for running on graphical processing units (GPUs). Furthermore, each AI network can include a variety of operations, including additions, multiplications, scalar or vector operations, matrix operations, tensor operations and others. Kernels can be used to implement one or more ops on the AI network. For example, a kernel can be a program code implementing matrix multiplication, an inverse function or any other op, ops or combination of ops that may be found in an AI network. With the hardware-specific approach of writing code for AI networks, kernel codes are manually written by human programmers based on the specification of the hardware on which the kernels are going to run on. Consequently, a kernel for a neural network will have to be manually rewritten if the network is to run on a different hardware platform. Hardware-specific kernels can be efficient, as their underlying code is written with their running time hardware in mind. Therefore, ops can be made more efficient and hardware utilization can be high in such implementations.

Another approach to coding an AI network, which allows for more platform flexibility, is to make the kernels hardware-independent (i.e., hardware-agnostic), where the code is adapted or modified depending on hardware platforms which may be used to run the AI network. This approach works similarly to how a high-level programming language can be written generically, with layers of data abstraction, as well as incorporating compilers, run-time processors, or pre-processors to make the appropriate conversions for the code to run on a given hardware platform. The disadvantage with this approach is that it can be significantly inefficient in performance in exchange for making the AI network code generic or hardware-independent.

Thus, there is a need in the field of computer science to create a new and useful system and method for providing optimized software implementations of artificial intelligence networks. The source of the problem, as discovered by the inventors, is a lack of software implementation methods for AI networks that result in efficient AI networks which are deployable across many different hardware components and platforms.

SUMMARY

Some of the disclosure herein relates to a method, computer-program product and a system for an Optimization Engine that allows for optimization of the cost of executing a artificial intelligence network based on tuning the operations and components utilized across the entire artificial intelligence network-instead of conventional tuning and optimization at the component level. In conventional systems, each individual kernel of an artificial intelligence network is optimized in isolation without consideration for the interdependencies of data, operations and other kernels. The Optimization Engine simulates the execution of various combinations of operations and kernels and other algorithms and components over the entire structure of the artificial intelligence network to identify operation, kernel, algorithm and component combinations that optimize the performance of the entire artificial intelligence network, instead of conventionally combining the execution of individually optimized kernels. The Optimization Engine thereby minimizes the run time of an entire artificial intelligence network, instead of achieving a run time resulting from a conventional summation of individually optimized kernels.

One embodiment relates to a system that receives a plurality of characteristics of a target artificial intelligence (AI) network. The system applies the plurality of characteristics of the target AI network to at least one of a static cost model and a heuristic AI network model. The system further receives (or generates) optimized target AI network configuration data from at least one of static cost model and the heuristic AI network model, the optimized target AI network configuration data representative of a subset of the characteristics of the target AI network that minimize a cost function of execution of the target AI network.

In some embodiments, end-to-end optimization can incorporate fallback between different classes of hardware (e.g., processor chips), depending on the specific capabilities and/or feature parities of the hardware in question.

In some embodiments, end-to-end optimization can be applied to a variety of optimization functions, including, e.g.: latency-optimized inference, throughput-optimized inference, latency-bound throughput, power (i.e., battery) consumption, power (i.e., battery)-saving optimized inference and multi-network inference, latency and/or throughput-bound power consumption, quality of the output, any other suitable optimization function, or any combination of the above.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1:
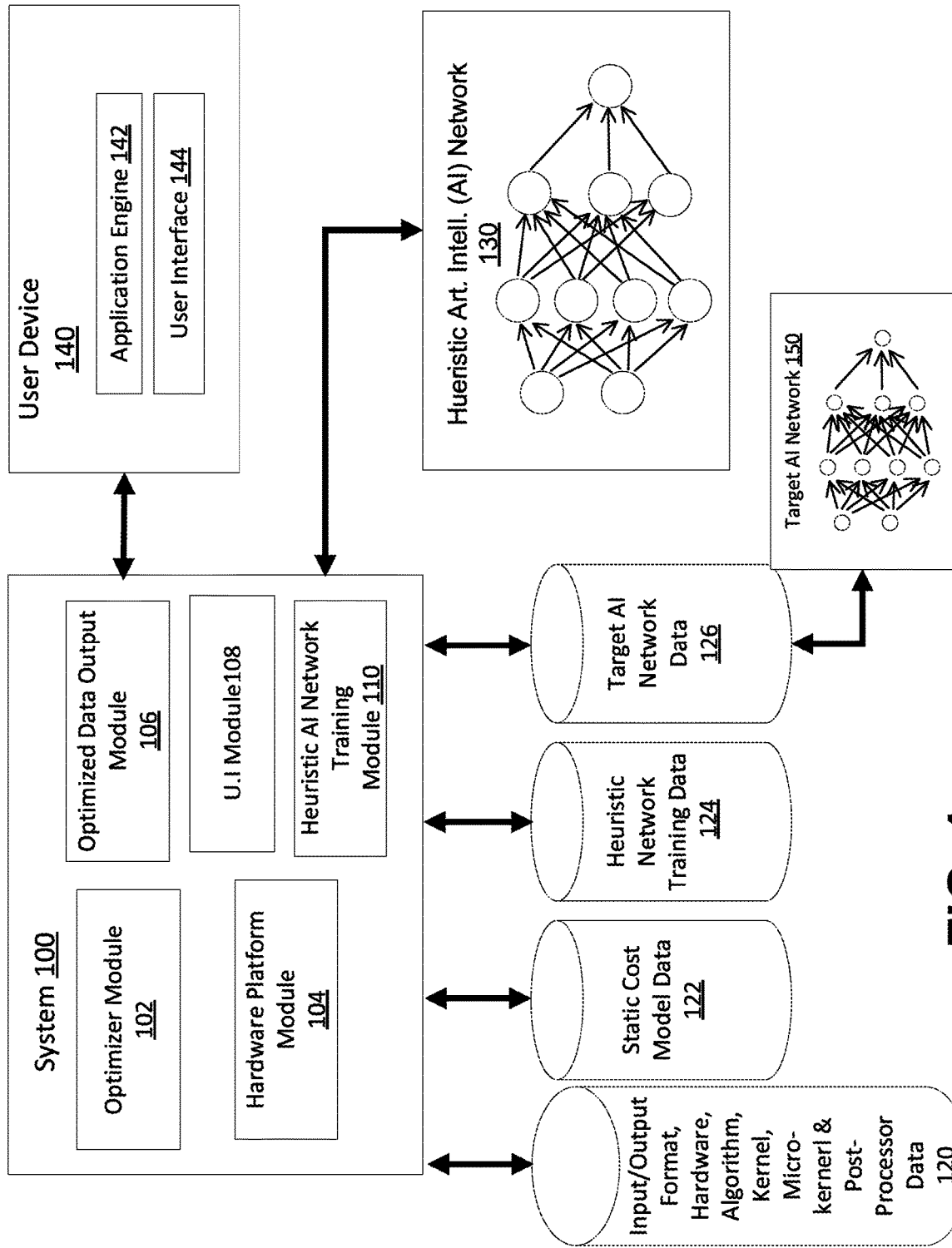
FIG. 1 is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Example use cases can illustrate the usefulness of end-to-end optimization according to some of the present embodiments. In a first scenario, a large social network company uses a combination of CPU chips and AI-focused field programmable gate array ("FPGA") chips in its data center. The company's FPGA chips do not support all neural network operations. The present methods and systems can be utilized to optimize the placement of these neural network operations between the CPU and the FPGA in order to minimize computational cost within their service-level agreement ("SLA") requirements.

In a second scenario, a large consumer electronics company runs a given piece of software on a System-on-Chips ("SoC") architecture, where the system on a chip contains CPUs and GPUs in an AI-focused FPGA chip. The present methods and systems can be utilized to optimize the placement of multiple neural networks across chips on their SoC systems, resulting in up to ten times increase in the speed of operations, and a much better hardware utilization.

FIG. 1 is a diagram illustrating an exemplary environment in which some embodiments may operate. FIG. 1 illustrates a block diagram of an example system 100 of the Optimization Engine The system 100 includes an optimizer module 102, a hardware platform module 104, and optimized data output module 106, a user interface (U.I.) module 108 and a heuristic AI network training module 110. The system 100 may communicate with a user device 140 to display output, via a user interface 144 generated by the optimizer module 102. The heuristic artificial intelligence network 130 and the databases 120, 122, 124, 126 may further be components of the system 100 as well.

The optimizer module 102 of the system 100 may perform functionality as illustrated in FIGS. 2, 3, 4 and 5 with respect to a target AI network 150.

The hardware platform module 104 of the system 100 may perform functionality as illustrated in FIGS. 2, 3, 4, 5 and 6 in order to support and manage execution of various types of hardware and hardware platforms.

The optimized data output module 106 of the system 100 may perform functionality in order to send output to the user device 140.

The user interface module 110 of the system 100 may perform functionality to cause display of any data resulting from functionality as illustrated in FIGS. 2, 3, 4, 5 and 6.

The heuristic AI network training module 110 may perform functionality as illustrated in FIGS. 2, 3, 4, 5 and 6.

While the databases 120, 122, 124, 126 are displayed separately, the databases 120, 122, 124, 126 and information maintained in the databases 120, 122, 124, 126 may be combined together or further separated in a manner the promotes retrieval and storage efficiency and/or data security.

Figure 2:
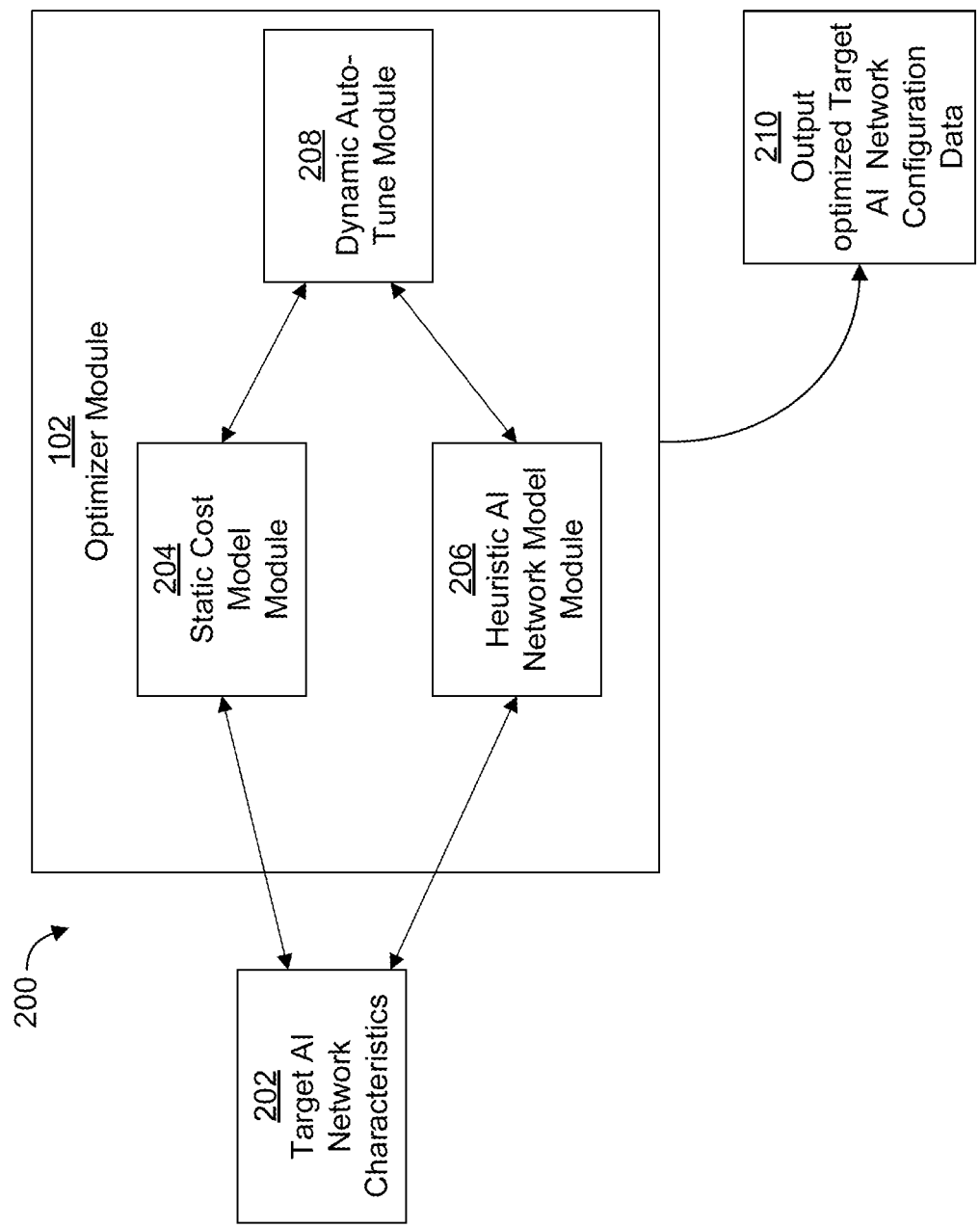
FIG. 2 is a diagram illustrating an exemplary environment in which some embodiments may operate.
Figure 6:
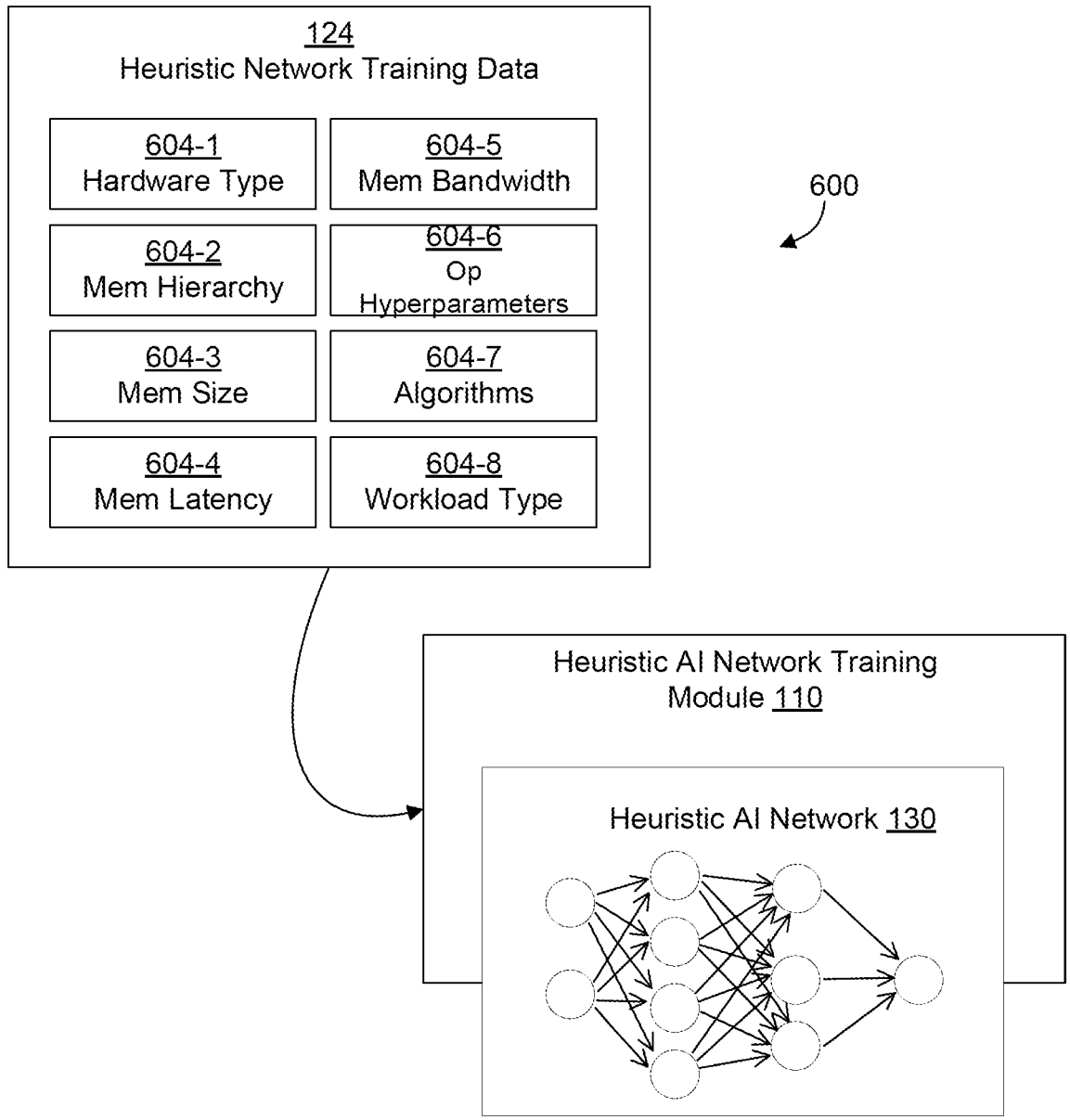
FIG. 6 is a diagram illustrating an exemplary environment in which some embodiments may operate.

As shown in FIG. 2, In various embodiments, the Optimization Engine receives as input a plurality of characteristics 202 of target AI network (such as a neural network) and generates output 210 that indicates configuration of the target AI network that allows for optimized execution of the target AI network in its entirety. The Optimization Engine executes according to a training phase and an optimization phase. During the training phase, the Optimization Engine trains a heuristic AI network according to various types of heuristic training data, as shown in FIG. 6. In the optimization phase, the Optimization Engine receives the plurality of characteristics 202 of the target AI network and selects either a static cost model or a heuristic artificial intelligence network model to identify the output optimized configuration 210 for the target AI network.

Based on selection of the static cost model, the dynamic auto-tune module 208 performs simulated executions of the entire target AI network that iterates over various component combinations of operations, kernels, micro-kernels, post-processor modules, algorithms, data formats, and underlying hardware in order to calculate various run time approximations that each corresponds with a simulated execution according to a particular component combination. The static cost model module 204 selects a component combination with an ideal run time and generates the output optimized configuration 210 based on the selected component combination.

Upon selection of the heuristic artificial intelligence network model during the optimization phase, the heuristic AI network model module 206 selects from any of the plurality of characteristics 202 of target AI network that align with input features of the heuristic AI network 130. The heuristic AI network model module 206 executes the heuristic AI network 130. Execution of the heuristic AI network 130 generates the output optimized configuration 210. In various embodiments, the heuristic AI network model module 206 may utilize the dynamic auto-tune module 208 to identify the run times of various operation combinations and kernel implementations.

Figure 3:
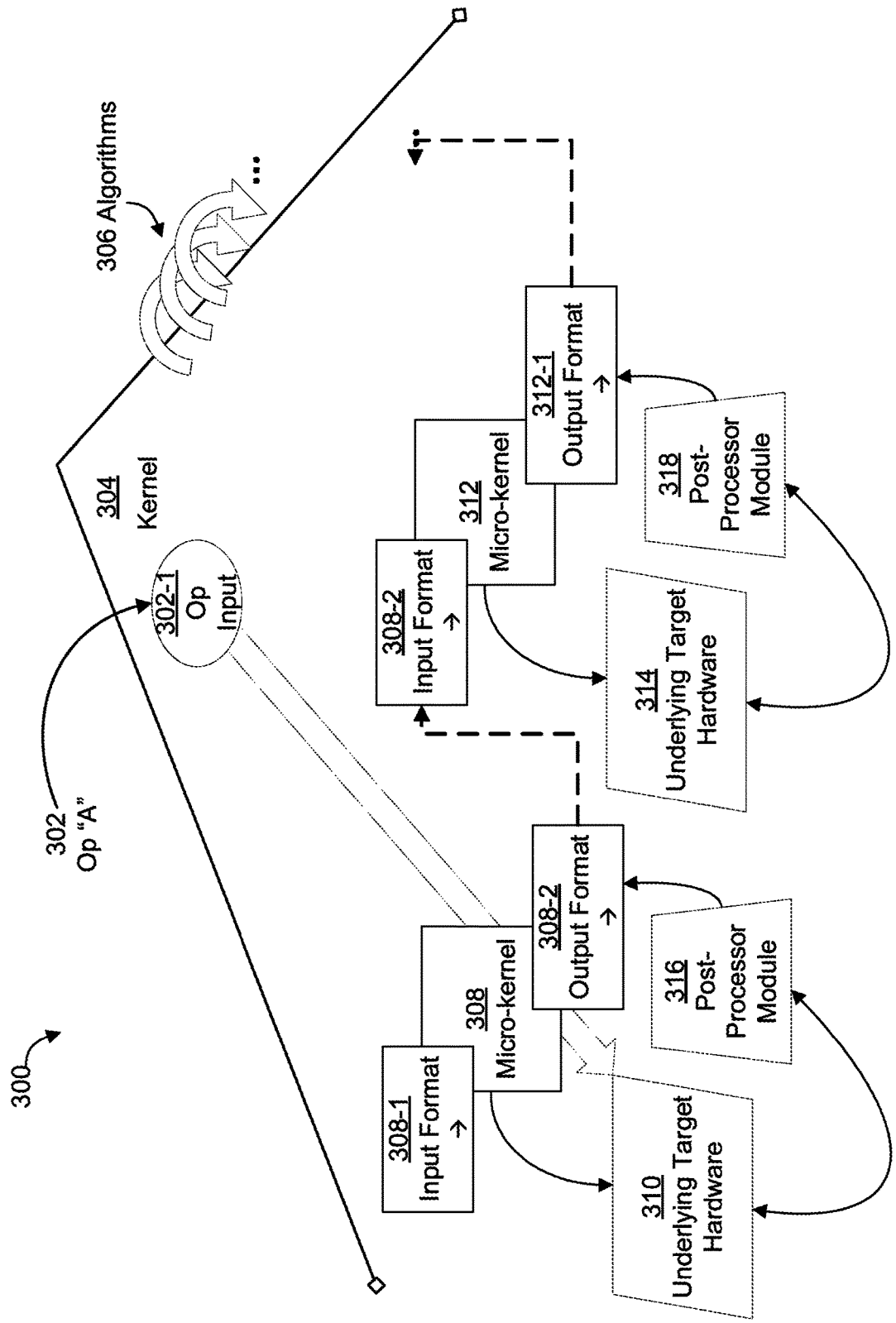
FIG. 3 is a diagram illustrating an exemplary environment in which some embodiments may operate.

As shown in FIG. 3, a high-level diagram 300 of a kernel implementation that illustrates an operation (Op "A") 302 associated with a kernel(s) 304. It is understood that Op "A" 302 is a computational operation which corresponds with a node(s) on a computational graph of a artificial intelligence network. In some embodiments, Op "A" 302 may be a conceptual representation of an operation(s) to be performed in the artificial intelligence network, whereby a kernel(s) 304 is one or more software instructions for implementing (or executing) Op "A" 302 according to a plurality of algorithms 306. For example, Op "A" 302 requires a call to a kernel(s) 304, which further calls one or more micro-kernels 308, 312.

In some embodiments, as operation input data 302-1 (such as a kernel-operation input data stream) is being streamed from a kernel 304 to underlying target hardware 310 (such as a CPU, GPU), a micro-kernel 308 may be implemented to execute ancillary hardware-supported operations on the streaming input data 302-1 to generate optimized input data for the underlying target hardware 310. For example, a micro-kernel 308 may modify a data format or a data arrangement of streaming input data 302-1 in order to ensure the target hardware 310 receives optimized input data 302-1 formatted to allow for efficient and optimal execution of Op "A" 302 (or a portion of Op "A") by the target hardware 310.

In some embodiments, end-to-end optimization can incorporate fallback between different classes of hardware (e.g., processor chips), depending on the specific capabilities and/or feature parities of the hardware in question. For example, a neural network might contain operations X, Y, and Z, and there might be 3 types of chips on the machine, e.g., CPU, GPU, and Neural Processing Unit ("NPU"). The NPU may not support the X operation due to hardware limitations, but may support the Y and Z operations. With standard software, this immediately causes the entire network to fail to run on the NPU. In contrast, the present system can determine the NPU's capabilities. It can then automatically configure the X operation to be performed on the CPU, which supports X, and automatically configure the Y and Z operations to be performed on the NPU, which supports Y and Z. The optimization aspect involves determining where X is to be performed, e.g., either on the CPU or the GPU. Depending on the memory bandwidth, latencies, and other factors between the 3 chips on the machine, the entire network may require optimization from end to end.

In various embodiments, there may be a plurality of micro-kernels 308, 312 associated with a kernel 304. Each respective micro-kernel 308, 312 may be compatible with a different target hardware(s) 310, 314 or a different hardware platform(s). Each respective micro-kernel 308, 312 may be defined to receive input data and generate output data according to a specific data format (i.e. data encoding format) 308-1, 308-2, 312-1. For example, a first micro-kernel 308 may require a different input data format than a second micro-kernel 312, especially when the first and second micro-kernels 308, 312 each correspond to different types of underlying target hardware 310, 314.

In various embodiments, at run time, a just-in-time compiler associated with the system 100 may generate software modules for a micro-kernel 308, 312 and one or more embedded post-processor modules 316, 318. Each embedded post-processor modules 316, 318 provide the micro-kernels 308, 312 with a capability of dynamically handling multiple, different types of input data formats 308-1, 308-2 and multiple, different types output data formats 308-2, 312-1. For example, a first embedded post-processor module 316 allows a micro-kernel 308 to accept input data 308-1 according to a first data format and produce output data 308-2 according to a second data format, where the first data format is of a different data format type than the second data format. A second embedded post-processor module 318 allows a second micro-kernel 312 to produce output data according to a third data format 312-1, where the first, second, and third data formats 308-1, 308-2, 312-1 are all different data format types.

According to various embodiments, when a particular underlying target hardware 310 generates output data as a result of performing an operation 302 (or a portion of the operation 302), a first embedded post-processor module 316 thereby accesses the underlying target hardware's output data located in accordance with the hardware's registers—as opposed to a conventional transpose operation(s) that requires read and write operations of data from main memory. Upon accessing the output data located in accordance with the hardware's registers, the first embedded post-processor module 316 arranges (i.e. rearranges, reformats) the accessed hardware output data in accordance with the output data format 308-2 of the first embedded post-processor module 308. In some embodiments, the output data format 308-2 of the first embedded post-processor module 308 may also be the input data format required by a second micro-kernel 312 that may be included in execution of the operation 302. It is understood that the second micro-kernel 312 may also receive a portion of the operation input data stream 302-1 and perform separate modifications of the operation input data stream 302-1 directed to a different type of underlying target hardware 314. The second micro-kernel 312 may apply a portion the input data received from the first micro-kernel 308 to the operation input data stream 302-1 received by the second micro-kernel 312.

Figure 4:
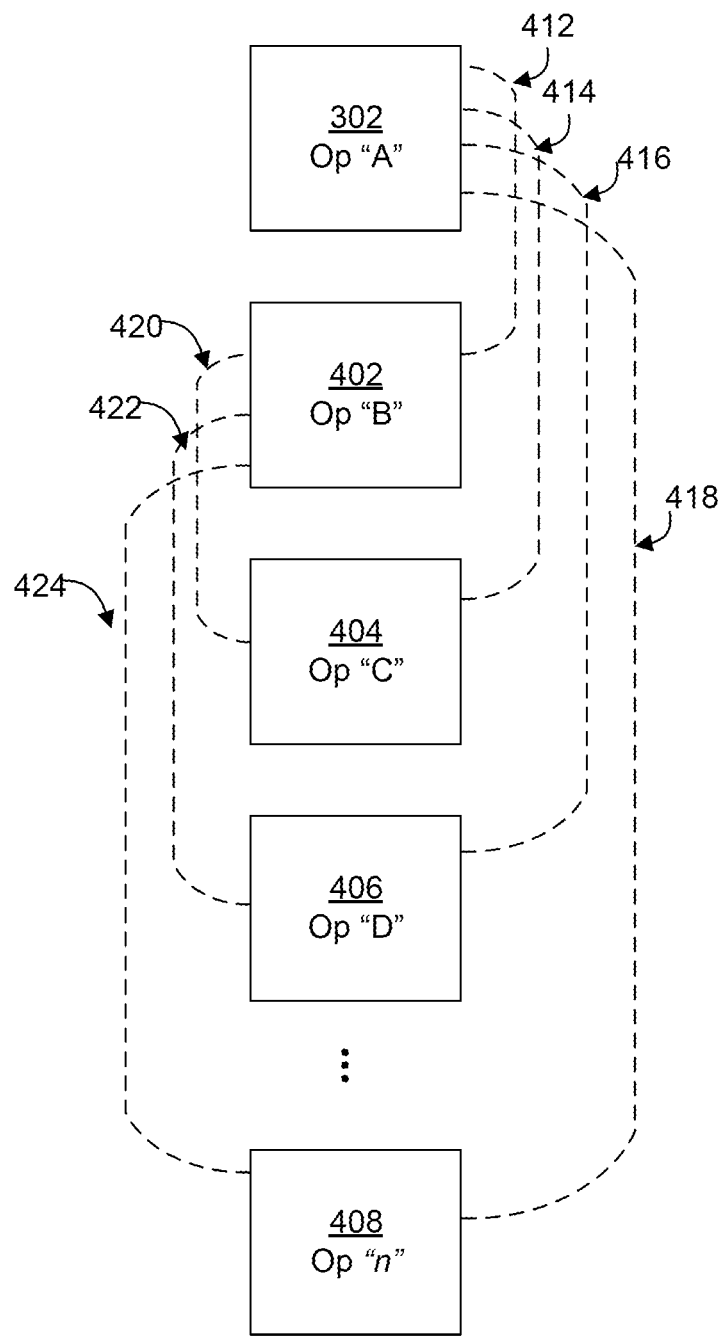
FIG. 4 is a diagram illustrating an exemplary environment in which some embodiments may operate.

As shown in FIG. 4, the dynamic auto-tune module 208 iterates over various component combinations of operations 302, 402, 404, 406 . . . 408, kernels, micro-kernels, post-processor modules, algorithms, data formats, and underlying hardware in order to calculate various run time approximations. Each approximated run time corresponds with a simulated execution according to a particular component combination. It is understood that each operation 302, 402, 404, 406 . . . 408 may requires the implementation of one or more kernels, algorithms, micro-kernels, target hardware and post-processor modules. The dynamic auto-tune module 208 communicates with both the static cost model module 204 and the heuristic AI network model module 206 in order to identify which components utilized across the entire target AI network will result in an optimized run time.

According to various embodiments, the dynamic auto-tune module 208 explores the search space of available algorithms and data layouts across various kernels to find the most optimal combinations of kernel implementations. The dynamic auto-tune module 208 simulates execution of the target AI network according to various sequences of operations 412, 414, 416, 418, 420, 422, 424. In addition, each operation sequence 412, 414, 416, 418, 420, 422, 424 may itself have various permutations with respect to one or more types of kernels used, one or more algorithms used, one or more micro-kernels used, one or more target hardware used and one or more post-processor modules used.

For example, the dynamic auto-tune module 208 may determine a simulated execution of the target AI network that includes an operation combination 412 of Op "A" 302 and Op "B" 402 according to respective kernel implementations may result an approximate run time of target AI network. However, the dynamic auto-tune module 208 may further determine that execution of the target AI network by augmenting operation combination 412 with Op "C" 404 according a particular kernel implementation actually results in an operation combination 414 (Op "A"+Op "B"+Op "C") that results in a faster approximated run time execution of all three operations 302, 402, 403 in total than the approximated run time realized with operation combination 412. Such a result may be detected due to various micro-kernels and post-processor modules employed in a permutation of the preceding operation combination 412 which generates a specialized formatted data input into Op "C" 404 that allows its kernel implementation to call the underlying hardware targeted by Op "C" 404 in such a highly-optimized manner that the efficiency gains from Op "C" 404 make up for any approximated run time execution lag from the preceding combination 412 (Op "A"+Op "B").

Similarly, the dynamic auto-tune module 208 may determine a simulated execution of the target AI network that includes various kernel implementations throughout an operation combination 423 of Op "B" 402, Op "C" 404, Op "D" 406 and all other operations up to Op "n" 408 may result in an approximate run time of target AI network. However, the dynamic auto-tune module 208 may further determine that execution of the target AI network with operation combination 420 (Op "B"+Op "C") according to a specific kernel implementation results in a specialized input data for Op "D" 406 that results in a faster approximated run time for the execution target AI network than if the target AI network were to execute operation combination 423 according to its corresponding kernel implementations.

Figure 5:
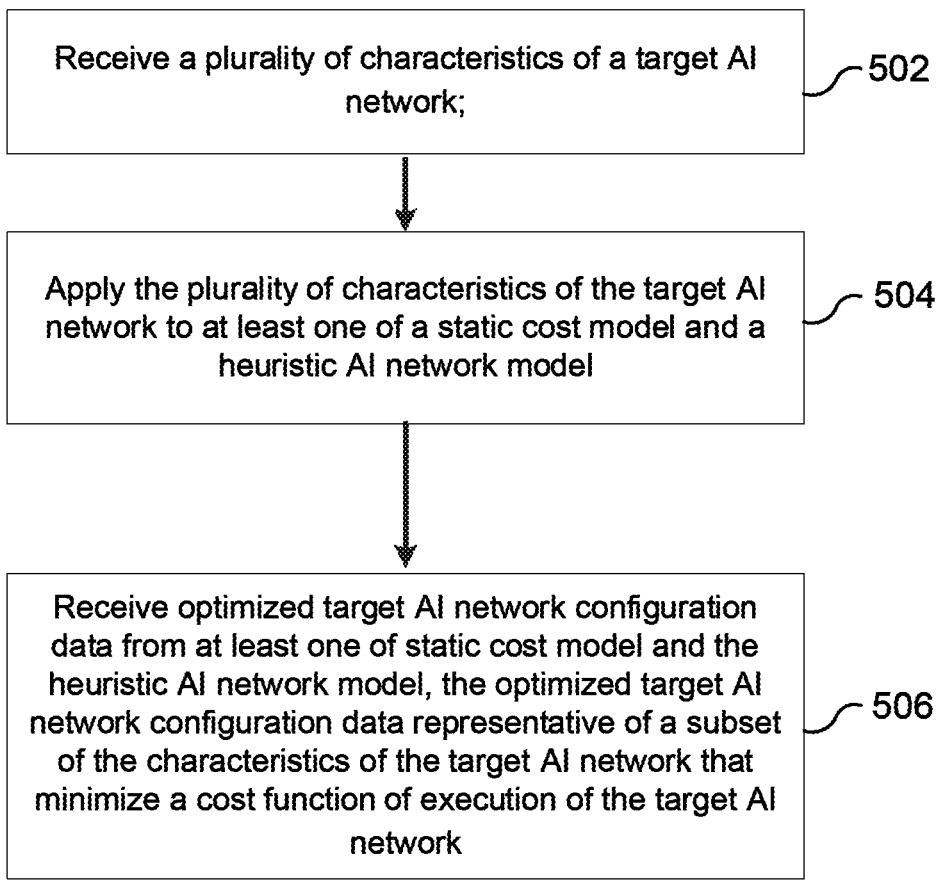
FIG. 5 is a flow chart illustrating an exemplary method that may be performed in some embodiments.

FIG. 5 is a flow chart illustrating one exemplary method 500 that may be performed consistent with an embodiment. The system 100 performing the method 500 may receive a plurality of characteristics of a target artificial intelligence (AI) network (Act 502). For example, the plurality of characteristics may be a plurality of operations that correspond to respective nodes on a computational graph of the target AI network. One or more kernels may implement one or more operations. In various embodiments, a kernel may be comprised of at least one microkernel for formatting a kernel-operation input data stream according to a target hardware input data format compatible with underlying target hardware supporting execution of the operation(s). At least one post-processor module may be embedded into each microkernel. Each post-processor module converts target hardware output data located in one or more target hardware registers from a first output data format native to the underlying target hardware to a second output data format that matches an input data format of a subsequent micro-kernel or subsequent kernel.

The system 100 may apply the plurality of characteristics of the target AI network to at least one of a static cost model and a heuristic AI network model (Act 504). For example, upon selection of the static cost model during the optimization phase, the system 100 simulates execution of the target AI network by iterating execution of the target AI network according to a plurality of differing kernel and post-processor module combinations with respect to at least a subset of the plurality of characteristics target AI network. Such iterative executions result in the system 100 obtaining a time cost approximation for each simulated target AI network execution, wherein each simulated target AI network execution corresponds to a distinct set of kernel combinations.

Upon selection of the heuristic AI network model during the optimization phase, the system 100 inputs at least a subset of the plurality of characteristics target AI network into a heuristic AI network trained according to heuristic network training data. The system executes the heuristic AI network in order to generate an approximation of run time of the target AI network according to a combination of one or more optimal data formats, one or more optimal operation-calculation algorithms per kernel, one or more optimal kernel and post-processor module combinations and one or more optimal underlying hardware specifications.

The system 100 may receiving optimized target AI network configuration data from at least one of static cost model and the heuristic AI network model (Act 506). The optimized target AI network configuration data may representative of a subset of the characteristics of the target AI network that minimize a cost function of execution of the target AI network. In addition, the system 100 may remove, from the target AI network, any operations, kernels, micro-kernels, post-processor modules that are excluded from the received optimized target AI network configuration data.

Some of the steps of exemplary method 500 may be performed in different orders or in parallel. Also, the steps of exemplary method 500 may occur in two or more computers, for example if the method is performed in a networked environment some steps may be performed on different computers. Various steps may be optional.

During a training phase, the heuristic AI network training module 110 trains a heuristic AI network 130 according to various types of heuristic training data 124, as shown in FIG. 6. The heuristic training data 124 may include, but is not limited to: various types of hardware (or hardware platforms) 604-1 targeted by operations and kernel implementations, various types of memory hierarchies 604-2, memory sizes 604-3, memory latencies 604-4 and memory bandwidths 604-5 used or observed with respect to storing, managing and modifying data during AI network execution. The heuristic training data 124 may also include various types of operation hyper-parameters 604-6, various types of algorithms and various type of workloads.

A non-limiting exemplary list of operation hyper-parameters includes: kernel width/height, input depth, one or more input/output features, padding type, padding dimensions, strides, dilations, epsilons and thresholds. A non-limiting exemplary list of algorithms includes: row-column matrix multiplication, column-row matrix multiplication, direct convolution, sparse convolution, Fast Fourier Transform (FFT) and winograd convolutions. A non-limiting exemplary list of workload types, i.e., varieties of optimization functions, includes: latency-optimized inference, throughput-optimized inference, latency-bound throughput, power (i.e., battery) consumption, power (i.e., battery)-saving optimized inference and multi-network inference, latency and/or throughput-bound power consumption, quality of the output, any other suitable optimization function, or any combination of the above.

Embodiments may be used on a wide variety of computing devices in accordance with the definition of computer and computer system earlier in this patent. Mobile devices such as cellular phones, smart phones, PDAs, and tablets may implement the functionality described in this patent.

In addition, embodiments may be based on training, utilization and execution of various machine learning, neural network, deep learning, or similar AI techniques, and combinations of AI techniques, such as a neural net based algorithm, Artificial Neural Network, or Deep Learning; a robust linear regression algorithm, such as Random Sample Consensus, Huber Regression, or Theil-Sen Estimator; a kernel-based approach like a Support Vector Machine and Kernel Ridge Regression; a tree-based algorithm, such as Classification and Regression Tree, Random Forest, Extra Tree, Gradient Boost Machine, or Alternating Model Tree; Naïve Bayes Classifier; and other suitable machine learning or similar algorithms.

Figure 7:
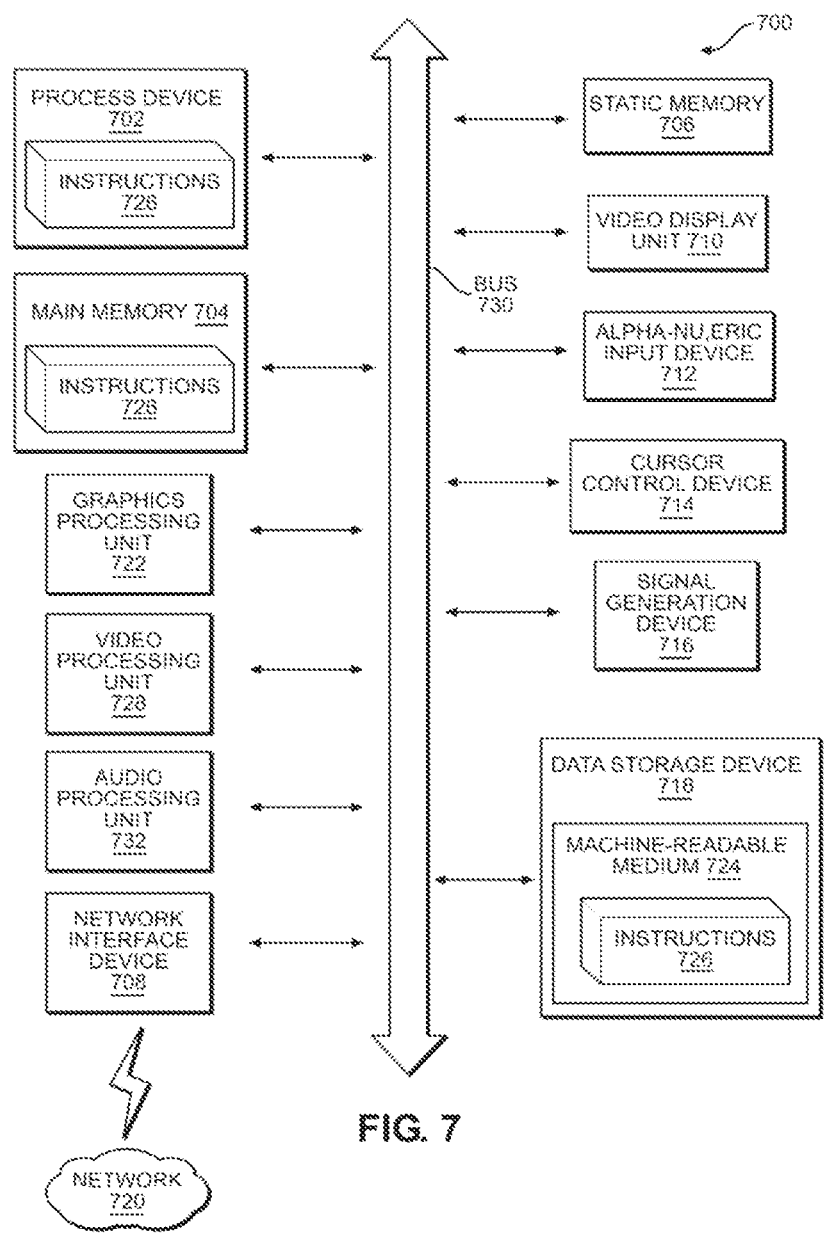
FIG. 7 is an exemplary diagram of one environment in which some embodiments may operate.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), an FPGA, a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse) or an input touch device, a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to the components of a device to perform the disclosure herein. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Embodiments may further include a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

Embodiments may include a machine-readable storage medium (also known as a computer-readable medium) on which is stored one or more sets of instructions or software embodying any one or more of the methodologies or functions described herein. The term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium"

shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method comprising:
   receiving a plurality of characteristics of a target artificial intelligence (AI) network;
   applying the plurality of characteristics of the target AI network to at least one of a static cost model and a heuristic AI network model; and
   receiving optimized target AI network configuration data from at least one of static cost model and the heuristic AI network model, the optimized target AI network configuration data representative of a subset of the characteristics of the target AI network that minimize a cost function of execution of the target AI network;
   wherein the plurality of characteristics of a target AI network comprises:
      a plurality of operations that correspond to respective nodes on a computational graph of the target AI network;
      at least one kernel for implementing one or more operations, the kernel comprised of at least one micro-kernel for formatting kernel-operation an input data stream according to a target hardware input data format compatible with underlying target hardware supporting execution of the operation; and
      at least one post-processor module embedded into each micro-kernel, wherein each post-processor module converts target hardware output data located in one or more target hardware registers from a first output data format native to the underlying target hardware to a second output data format that matches an input data format of a subsequent micro-kernel.

2. The computer-implemented method of claim 1, wherein applying the plurality of characteristics of the target AI network to the static cost model comprises:
   simulating execution of the target AI network by iterating execution of the target AI network according to a plurality of differing kernel and post-processor module combinations with respect to at least a subset of the plurality of characteristics target AI network; and
   obtaining a time cost approximation for each simulated target AI network execution, wherein each simulated target AI network execution corresponds to a distinct set of kernel combinations.

3. The computer-implemented method of claim 2, wherein receiving optimized target AI network configuration data from the static cost model comprises:
   selecting a time cost approximation that corresponds with a particular simulated target AI network execution; and
   receiving a select distinct set of kernel and post-processor module combinations utilized during the particular simulated target AI network execution associated with the selected time cost approximation.

4. The computer-implemented method of claim 1, wherein applying the plurality of characteristics of the target AI network to the heuristic AI network model comprises:
   inputting at least a subset of the plurality of characteristics target AI network into a heuristic AI network trained according to heuristic network training data; and
   wherein receiving optimized target AI network configuration data from heuristic AI network model comprises:
      receiving an approximation of run time of the target AI network according to a combination of one or more optimal data formats, one or more optimal operation-calculation algorithms per kernel, one or more optimal kernel and post-processor module combinations and one or more optimal underlying hardware specifications.

5. The computer-implemented method of claim 4, wherein the heuristic network training data comprises at least one of:
one or more underlying hardware microchip types, one or more memory hierarchies, one or more AI network structures, one or more operation hyperparameters, one or more optimal operation-calculation algorithms, one or more kernels and one or more post-processor modules.

6. The computer-implemented method of claim 1, wherein receiving optimized target AI network configuration data comprises:
removing, from the target AI network, at least one of:
one or more operations, one or more kernels, one or more micro-kernels and one or more post-processor modules that are excluded from the received optimized target AI network configuration data.

7. A system comprising:
one or more processors; and
a non-transitory computer readable medium storing a plurality of instructions, which when executed, cause the one or more processors to:
receive a plurality of characteristics of a target artificial intelligence (AI) network;
apply the plurality of characteristics of the target AI network to at least one of a static cost model and a heuristic AI network model to; and
receive optimized target AI network configuration data from at least one of static cost model and the heuristic AI network model, the optimized target AI network configuration data representative of a subset of the characteristics of the target AI network that minimize a cost function of execution of the target AI network;
wherein the plurality of characteristics of a target AI network comprises:
a plurality of operations that correspond to respective nodes on a computational graph of the target AI network;
at least one kernel for implementing one or more operations, the kernel comprised of at least one micro-kernel for formatting kernel-operation an input data stream according to a target hardware input data format compatible with underlying target hardware supporting execution of the operation; and
at least one post-processor module embedded into each micro-kernel, wherein each post-processor module converts target hardware output data located in one or more target hardware registers from a first output data format native to the underlying target hardware to a second output data format that matches an input data format of a subsequent micro-kernel.

8. The system of claim 7, wherein instructions, which when executed, cause the one or more processors to apply the plurality of characteristics of the target AI network to the static cost model further comprise one or more instructions, which when executed, cause the one or more processors:
simulate execution of the target AI network by iterating execution of the target AI network according to a plurality of differing kernel and post-processor module combinations with respect to at least a subset of the plurality of characteristics target AI network; and
obtain time cost approximation for each simulated target AI network execution, wherein each simulated target AI network execution corresponds to a distinct set of kernel combinations.

9. The system of claim 8, wherein the instructions, which when executed, cause the one or more processors to receive optimized target AI network configuration data from the static cost model further comprise one or more instructions, which when executed, cause the one or more processors to:
select a time cost approximation that corresponds with a particular simulated target AI network execution; and
receive a select distinct set of kernel and post-processor module combinations utilized during the particular simulated target AI network execution associated with the selected time cost approximation.

10. The system of claim 7, wherein the instructions, which when executed, cause the one or more processors to apply the plurality of characteristics of the target AI network to the heuristic AI network model further comprise one or more instructions, which when executed, cause the one or more processors to:
input at least a subset of the plurality of characteristics target AI network into a heuristic AI network trained according to heuristic network training data; and
receive optimized target AI network configuration data from heuristic AI network model, wherein the receiving the optimized target AI network configuration data comprises:
receiving an approximation of run time of the target AI network according to a combination of one or more optimal data formats, one or more optimal operation-calculation algorithms per kernel, one or more optimal kernel and post-processor module combinations and one or more optimal underlying hardware specifications.

11. The system of claim 10, wherein the heuristic network training data comprises at least one of:
one or more underlying hardware microchip types, one or more memory hierarchies, one or more AI network structures, one or more operation hyperparameters, one or more optimal operation-calculation algorithms, one or more kernels and one or more post-processor modules.

12. The system of claim 7, wherein the instructions, which when executed, cause the one or more processors to receive optimized target AI network configuration data further comprise one or more instructions, which when executed, cause the one or more processors to:
remove, from the target AI network, at least one of:
one or more operations, one or more kernels, one or more micro-kernels and one or more post-processor modules that are excluded from the received optimized target AI network configuration data.

13. A non-transitory computer-readable medium comprising instructions for inferring information about a product, the non-transitory computer-readable medium comprising instructions for:
receiving a plurality of characteristics of a target artificial intelligence (AI) network;
applying the plurality of characteristics of the target AI network to at least one of a static cost model and a heuristic AI network model to; and
receiving optimized target AI network configuration data from at least one of static cost model and the heuristic AI network model, the optimized target AI network configuration data representative of a subset of the characteristics of the target AI network that minimize a cost function of execution of the target AI network;
wherein the plurality of characteristics of a target AI network comprises:
a plurality of operations that correspond to respective nodes on a computational graph of the target AI network;

at least one kernel for implementing one or more operations, the kernel comprised of at least one micro-kernel for formatting kernel-operation an input data stream according to a target hardware input data format compatible with underlying target hardware supporting execution of the operation; and at least one post-processor module embedded into each micro-kernel, wherein each post-processor module converts target hardware output data located in one or more target hardware registers from a first output data format native to the underlying target hardware to a second output data format that matches an input data format of a subsequent micro-kernel.

14. The non-transitory computer-readable medium of claim 13, wherein applying the plurality of characteristics of the target AI network to the static cost model comprises: simulating execution of the target AI network by iterating execution of the target AI network according to a plurality of differing kernel and post-processor module combinations with respect to at least a subset of the plurality of characteristics target AI network; and obtaining a time cost approximation for each simulated target AI network execution, wherein each simulated target AI network execution corresponds to a distinct set of kernel combinations.

15. The non-transitory computer-readable medium of claim 14, wherein receiving optimized target AI network configuration data from the static cost model comprises:
selecting a time cost approximation that corresponds with a particular simulated target AI network execution; and
receiving a select distinct set of kernel and post-processor module combinations utilized during the particular simulated target AI network execution associated with the selected time cost approximation.

16. The non-transitory computer-readable medium of claim 13, wherein applying the plurality of characteristics of the target AI network to the heuristic AI network model comprises:
inputting at least a subset of the plurality of characteristics target AI network into a heuristic AI network trained according to heuristic network training data; and
wherein receiving optimized target AI network configuration data from heuristic AI network model comprises:
receiving an approximation of run time of the target AI network according to a combination of one or more optimal data formats, one or more optimal operation-calculation algorithms per kernel, one or more optimal kernel and post-processor module combinations and one or more optimal underlying hardware specifications,
wherein the heuristic network training data comprises at least one of:
one or more underlying hardware microchip types, one or more memory hierarchies, one or more AI network structures, one or more operation hyperparameters, one or more optimal operation-calculation algorithms, one or more kernels and one or more post-processor modules.

17. The non-transitory computer-readable medium of claim 13, wherein receiving optimized target AI network configuration data comprises:
removing, from the target AI network, at least one of:
one or more operations, one or more kernels, one or more micro-kernels and one or more post-processor modules that are excluded from the received optimized target AI network configuration data.

* * * * *